United States Patent [19]

Osada et al.

[11] 4,456,854
[45] Jun. 26, 1984

[54] COMPACT FLUORESCENT LAMP

[75] Inventors: Kimio Osada; Motokazu Hayashi; Taketo Kamei, all of Yokosuka, Japan

[73] Assignee: Tokyo Shibaura Denki Kabushiki Kaisha, Kawasaki, Japan

[21] Appl. No.: 279,199

[22] Filed: Jun. 30, 1981

[30] Foreign Application Priority Data

Jul. 15, 1980 [JP]  Japan .................................. 55-96784
Jul. 15, 1980 [JP]  Japan .................................. 55-96785
Jul. 15, 1980 [JP]  Japan .................................. 55-96786

[51] Int. Cl.³ .......................................... H01J 7/44
[52] U.S. Cl. .................................... 315/58; 315/59; 315/71; 313/493
[58] Field of Search ...................... 315/58, 59, 71, 108; 313/240, 242, 318, 493; 339/59 L, 61 C, 65, 66 T, 277 R, 278 L, 75 R, 91 L

[56] References Cited

U.S. PATENT DOCUMENTS

| | | | |
|---|---|---|---|
| 3,808,495 | 4/1974 | Win | 313/242 X |
| 3,953,761 | 4/1976 | Giudice | 315/71 |
| 4,165,143 | 8/1979 | Puhak | 339/91 L |
| 4,187,446 | 2/1980 | Gross et al. | 315/58 |
| 4,199,708 | 4/1980 | Lauwerijssen et al. | 313/493 |
| 4,270,071 | 5/1981 | Morton | 315/58 X |
| 4,300,073 | 11/1981 | Skwirut et al. | 315/59 X |
| 4,305,637 | 12/1981 | Grewcock et al. | 313/318 X |
| 4,347,460 | 8/1982 | Latassa et al. | 313/493 X |
| 4,389,595 | 6/1983 | Kamei et al. | 313/493 X |

*Primary Examiner*—Eugene R. LaRoche
*Assistant Examiner*—Vincent DeLuca
*Attorney, Agent, or Firm*—Oblon, Fisher, Spivak, McClelland & Maier

[57] ABSTRACT

A compact fluorescent lamp having a chassis member including a cylindrical part including a generally cylindrical thread portion and a cylindrical straight portion. A longitudinal recess is provided on the outside of the cylindrical part. The chassis member also includes a holding plate and a maintaining plate including an edge wall member and projections having notches. A screw base is secured to the thread portions of the cylindrical part and a base member is attached to the cylindrical part. A winding envelope formed by bending a straight tube twice into U-shapes and a ballast are respectively mounted to the maintaining plate and the holding plate, and a globe member is attached to the base member.

9 Claims, 5 Drawing Figures

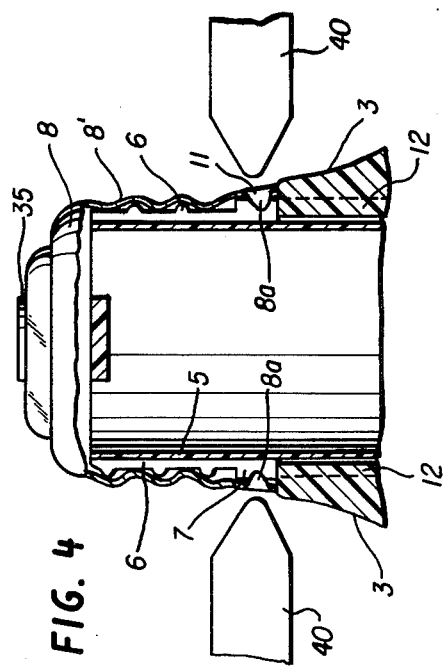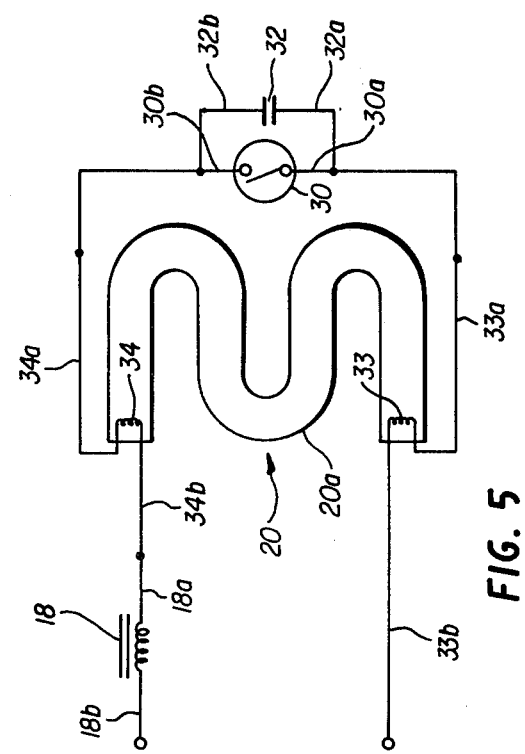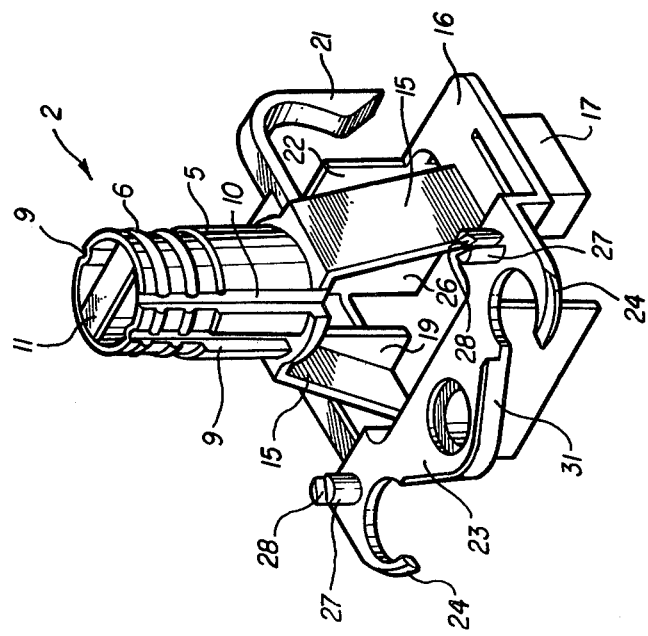

COMPACT FLUORESCENT LAMP

BACKGROUND OF THE INVENTION

1. Field of the Invention:

This invention relates generally to a compact fluorescent lamp provided with a screw base, and more particularly to the structure of a chassis member to which is attached a ballast, a winding envelope and other equipment.

2. Description of the Prior Art:

Fluorescent lamps have been used as a general source of illumination for many years. A fluorescent lamp has high lighting efficiency and a low consumption of electric power in comparison with an incandescent lamp and therefore a compact fluorescent lamp provided with an incandescent lamp base, i.e. an E 26-type screw base, has been developed. But in the order to interchange an incandescent lamp with such a compact fluorescent lamp, it is necessary for the fluorescent lamp to have a folded envelope because, in order to obtain about the same brightness as with an incandescent lamp, it is necessary for the fluorescent lamp's envelope to have a certain minimum length. Such a compact fluorescent lamp is known, for example from U.S. Pat. Nos. 3,953,761 and 4,199,708. Such a fluorescent lamp has a lamp base providing a plurality of screw thread portions, a screw base which is secured to the thread portions of the lamp base, a globe, a partition plate dividing the base side and the globe side, a winding envelope and a ballast provided to the partition plate, in which screw threads are formed on both the lamp base and the screw base itself. However, as the screw base is mounted directly to the lamp base in a conventional lamp, it is necessary for the lamp base to be subjected not only to a torsion moment when attaching to a socket but also to the total weight of the lamp including a heavy ballast, a winding envelope and other equipment attached by way of the partition plate. So it is desirable that the connection between the screw base and the lamp base be modified.

Moreover, a lead wire which is connected to the edge of the screw base is wired along the screw thread portions of the lamp base. Therefore when the screw base is fixed by screwing to the screw thread portions of the lamp base, the lead wire moves according to the moving of the screw base. Consequently, the position of the lead wire relative to the screw base can not be determined uniformly, so the efficiency of the next soldering step decreases.

Moreover, it is desirable from the standpoint of safety, that the many lead wires of the winding envelope, the ballast and the glow starter are arranged so that they can not be directly touched by fingers.

SUMMARY OF THE INVENTION

Accordingly, one object of this invention is to provide a novel compact fluorescent lamp in which a chassis member has a slot for guiding a lead wire.

Another object of this invention is to provide a novel compact fluorescent lamp exhibiting a stable fixing of the chassis member and a screw base.

Yet another object of this invention is to provide a novel compact fluorescent lamp in which the chassis member has an edge member preventing touching contact.

These and other objects have now been achieved according to this invention by providing the new and improved chassis member of the compact fluorescent lamp described below.

BRIEF DESCRIPTION OF THE DRAWINGS

A more complete appreciation of this invention and many of the attendant advantages thereof will be readily obtained as the same becomes better understood by reference to the following detailed description when considered in connection with the accompanying drawings wherein:

FIG. 3 is a perspective view of a chassis member of a compact fluorescent lamp of this invention;

FIG. 4 is an enlarged elevational view, partly in cross-section, of a screw base fixed to a chassis member of a compact fluorescent lamp of this invention; and FIG. 5 is a schematic diagram of an electric circuit embodying this invention.

DETAILED DESCRIPTION OF THE PREFERRED EMBODIMENT

Figure 1:
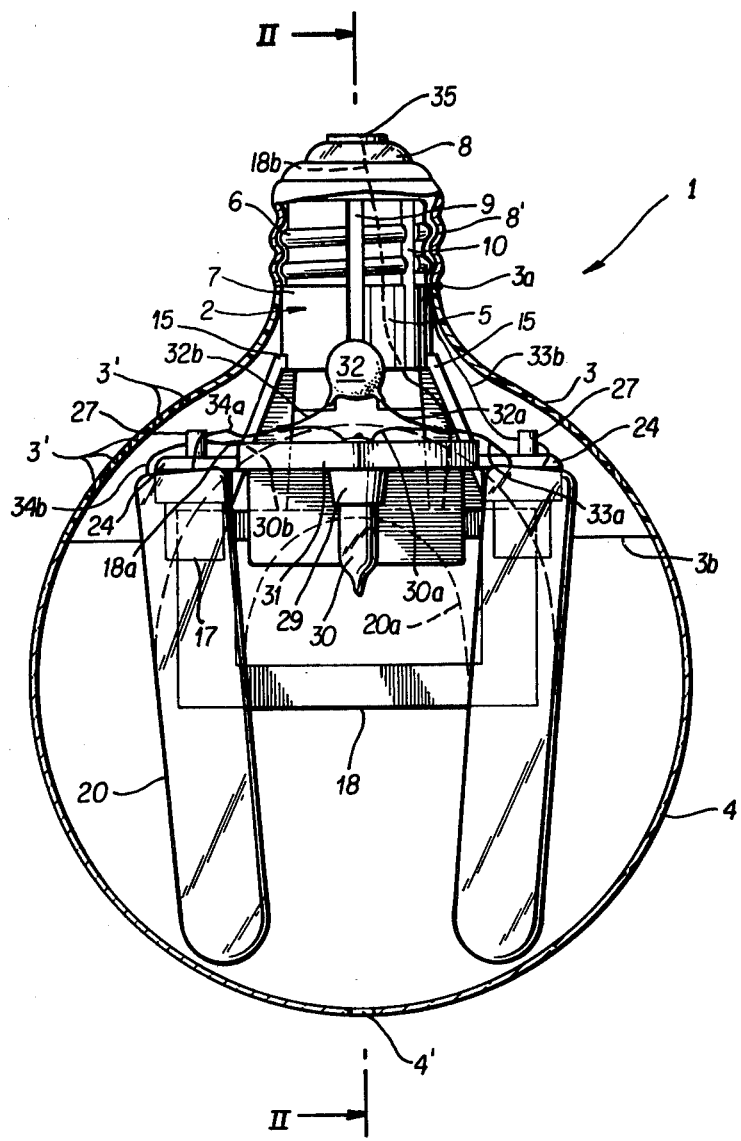
FIG. 1 is a longitudinal cross-sectional view of a compact fluorescent lamp of this invention.
Figure 2:
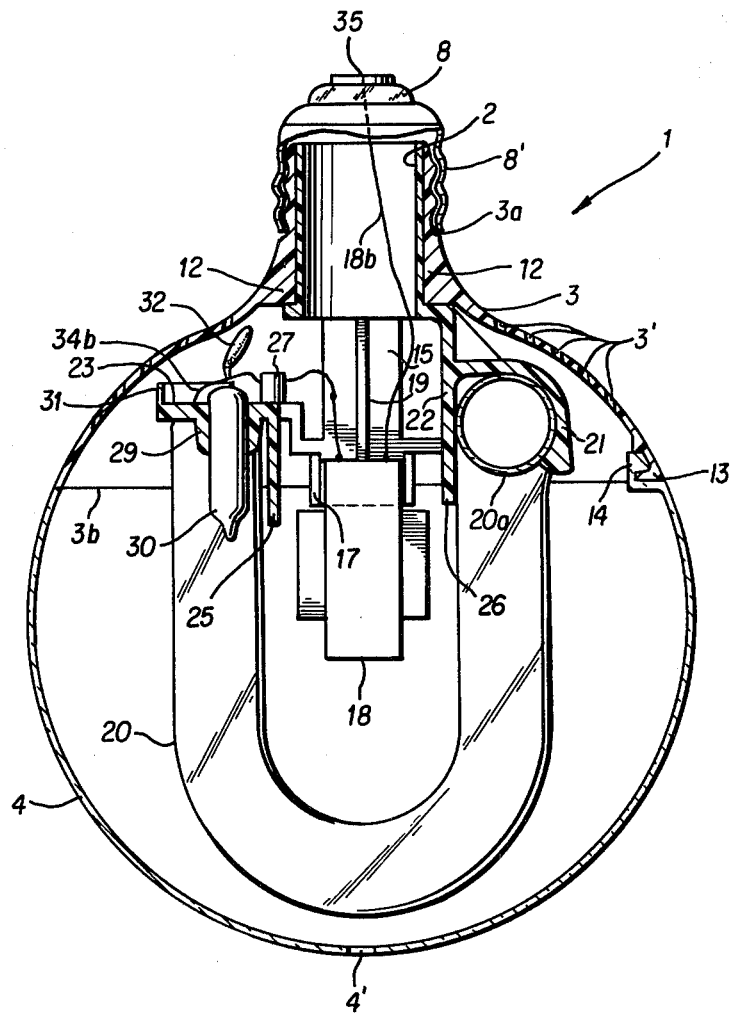
FIG. 2 is a view taken on line II—II of FIG. 1.

Refering now to the drawings wherein like reference numerals designate identical or corresponding parts through the several views, and more particularly to FIGS. 1, 2, and 3 thereof, a compact fluorescent lamp 1 having a chassis member 2, a lamp base member 3 and a globe member 4, is shown. The chassis member 2 is made of heat proof plastics (i.e. polycarbonate resin) and includes a cylindrical part 5 at one end thereof.

The cylindrical part 5 consists of a plurality of screw thread portions 6 and a straight portion 7 which is formed to one end of the screw thread portions 6. The length of the screw thread portions 6 of the cylindrical part 5 is formed shorter than that of thread portions 8' formed on an incandescent lamp screw base 8 (i.e. E-26 type base). The diameter of the screw thread portions 6 is formed only slightly smaller than that of the straight portion 7. Moreover, the cylindrical part 5 is formed with opposing longitudinal recesses or slots 9 and longitudinal slot 10 extending along the entire length of the outer surface thereof. Moreover, as best seen in FIG. 3, the top end of each of the recesses 9 and the slot 10 are open. A beam 11 is provided across the top end of the cylindrical part 5 to mechanically reinforce the cylindrical part 5.

The hemisphere shaped base member 3, having an upper opening 3a and a lower opening 3b, is attached to the cylindrical part 5 of the chassis member 2. The inside surface of the upper opening 3a is provided with opposing projection parts 12 and the attachment of the cylindrical part 5 to the base member 3 is accomplished by positioning the projections 12 of the base member 3 in the recesses 9 of the chassis member 2. An incandescent lamp screw base 8 is fixed by screwing to the screw thread portions 6 of the cylindrical part 5.

As best seen in FIG. 4, a more certain fixing between the screw base 8 and the cylindrical part 5 is achieved by forming fixing projections 8a at the portion of the screw base 8 corresponding to the portions of recesses 9 provided at the straight portion 7 of the cylindrical part 5. The projections 8a may be formed by punching the screw base with punches 40 once that screw base 8 has been positioned on the screw thread portions 6.

Moreover, the base member 3 is provided with a plurality of arc-shaped openings 3' adjacent the lower peripheral opening 3b. The lower opening 3b of the base member 3 is mounted to the bowl shape globe member 4 which is made of plastics (i.e. polycarbonate) and colored, for example, white. Moreover the globe member 4 has plurality of openings 4' to flow air near the top thereof. The connection of the base member 3 and the globe member 4 is achieved by cooperating hook portions 13 and 14 provided respectively at the peripheries of the base member 3 and the globe member 4.

On the other hand, two arm parts 15 are formed at one end on the cylindrical part 5 of the chassis member 2. A rectangular holding plate 16 is mounted to the top of the arm parts 15. A pair of opposed channel shaped fixing wall members 17 are respectively mounted in the holding plate 16 so as to face each other.

Between these fixing wall members 17, the top of a ballast 18 is positioned and is fixed with its lead wires 18a, 18b directed to the base member 3. Further the height of the fixing walls 17, is about from 20 to 25 percent of the height of the ballast 18. Moreover, a rib 19 is respectively provided inside each of the arm parts 15, not only to reinforce the arm parts 15 but also to provide a stop face for the top of the ballast 18. A winding envelope 20 is mounted to the holding plate 16 so as to surround the ballast 18. The winding envelope 20 is made by bending a straight glass tube into a U-shape to form a first bent part 20a and a pair of first leg parts 20b, followed by the bending once more of each of the pair of leg parts 20b into second U-shapes to form second leg parts 20c and two pairs of second bent parts 20d. The thus formed winding envelope 20 is of a small and compact shape which may be referred to as a saddle shape envelope.

The holding plate 16 of the chassis member 2 also provides a hook arm member 21 by way of a spreader plate 22 to hold the first bent part 20a of the winding envelope 20 and a maintaining plate 23 having parts 24 to hold both ends of the winding envelope 20. The first bent part 20a of the winding envelope 20 is maintained between the hook arm member 21 and the spreader plate 22. The maintaining plate 23 is formed like a flange having semicircle pieces 24 at both ends thereof and the semicircle pieces 24 hold both ends of the winding envelope 20. Moreover, the holder plate 16 of the chassis member 2 provides a large heat shield plate 25 mounted to the maintaining plate 23 and a small heat shield plate 26 mounted to the spreader plate 22. Consequently, the heat from the ballast 18 to the first bent part 20a and both ends of the winding envelope 20 is shielded by the large and small heat shield plates 25 and 26.

The maintaining plate 23 also provides a pair of guide projections 27 each having a longitudinal notch 28, the notches being directed toward the central axis of the cylindrical part 5. Consequently, the notches of the guide projections 27 and the slot 10 of the cylindrical part 5 face each other. Moreover, the maintaining plate 23 provides a holder wall 29 for a glow starter 30 at the center thereof and directly in front of the large heat shield plate 25. The glow starter 30 is held by insertion into the holder wall 29.

Moreover, the maintaining plate 23 also includes an edge member such as an edge wall 31 at the edge on the same side of the maintaining plate as the guide projections 27. The edge wall 31 has a sufficient height to reduce the clearance formed when the chassis member 2 is attached to the base member 3 such that fingers cannot be inserted to touch the lead wires. The ends of the edge wall 31 extend to the semicircle pieces 24.

Lead wires 30a and 30b of the glow starter 30 are respectively connected to the lead wires 32a and 32b of a condenser 32 by twisting each of the connected lead wires, and each of the sets of connected wires 30a and 32a, as well as 30b and 32b are respectively connected by soldering to lead wires 33a and 34a of electrodes 33 and 34 mounted to the ends of the winding envelope 20. These sets of lead wires 30a, 32a and 33a, as well as 30b, 32b and 34a are wired in a straight line and are prevented from protruding beyond the edge wall 31. The lead wires 33b and 34b of the electrodes 33 and 34 are respectively connected to the edge of the screw base 8 and to the lead wire 18a of the ballast 18. That is, after the lead wire 33b is inserting into the notch 28, it is lead to the edge of the screw base 8 by way of the slot 10 of the cylindrical part 5 which requires the shortest travel distance for the lead wire 33b. The end of the lead wire 33b is connected to the edge of the screw base 8 by soldering. The lead wire 18b of the ballast 18 is connected by soldering after being guided through the inside of the cylindrical part 5, to an outer contact 35 of the screw base 8.

The inner surface of the winding envelope 20 is coated with phosphors, and a predetermined amount of mercury and inert gases are sealed in the winding envelope 20.

In the compact fluorescent lamp the longitudinal slot 10 is provided on the cylindrical parts of the chassis member 2. Consequently, since the lead wire 33b is lead to the edge of the screw base 8 by way of the slot 10, the movement of the lead wire 33b is checked even when the screw base 8 is fixed by screwing to the thread portions 6 of the cylindrical part 5. As the position of the lead wire 33b to the screw base 8 is uniform, the efficiency of the next manufacturing step increases.

Moreover, the guide projections 27 having notches 28 are provided on the maintaining plate 23 so as to direct the notches 28 to the slot 10 of the cylindrical part 5, so the lead wire 33b of the electrode 33 is not only fixed firmly by inserting into the notch 28 of a guide projection 27, but is also lead to the slot 10 by the shortest distance. (Such wiring by the shortest distance prevents the wiring from being complex and leads to a low cost of the wiring materials.)

Futhermore, the length of the thread portions 6 of the cylindrical part 5 is formed shorter than that of the thread portions 8' of the screw base 8, and the diameter of the thread portions 6 is formed slightly smaller than that of the straight portion 7. Consequently, when the screw base 8 is attached to the cylindrical part 5, the inside surface of the non-thread portions of the screw base 8 and the outside surface of the straight portion 7 are in surface contact with each other. Thus the frictional resistance to turning increases and the fixing of the screw base 8 to the cylindrical part 5 becomes firm and stable. Moreover, by use of the punch 40, the fixing of the screw base 8 to the cylindrical part 5 is assured. Such a stable fixing of the screw base 8 is desirable in a compact fluorescent lamp which requires high mechanical strength at the screw base portion.

Moreover, since the edge wall 31 is provided at the edge of the maintaining plate 23, the wired lead wires of the winding envelope 20, the glow starter 30 and the condenser 32 may be held on the maintaining plate 23 and the edge wall 31 prevents these lead wires from protruding beyond the maintaining plate 23. When the chassis member 2 including the maintaining plate 23 is attached to the base member 3, the edge wall 31 prevents fingers from touching the lead wires. A plurality of projections formed at adequate intervals, instead of the edge wall 31, would of course provide the same function as the edge wall 31.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A compact fluorescent lamp comprising:
   a chassis member;
   a screw base secured to said chassis member;
   a base member attached to said chassis member;
   a winding envelope, including a bent part integrally connected to end parts, attached to said chassis member;
   a ballast mounted to said chassis member; and
   a globe member attached to said base member;
   wherein said chassis member comprises:
   a cylindrical part including a generally cylindrical screw thread portion to which said screw base is secured, and a cylindrical straight portion to which said base member is attached;
   a holding plate provided with fixing wall members for fixing said ballast; and
   a maintaining plate for holding the end parts of said winding envelope and a glow starter
   wherein said cylindrical part includes at least a first elongated recess formed in said screw thread portion and said straight portion on the outside thereof for guiding a lead wire of an electrode mounted to said winding envelope.

2. The compact fluorescent lamp of claim 1 wherein said screw base includes thread portions and wherein the length of said screw thread portion of said cylindrical part is shorter than that of the thread portions of said screw base.

3. The compact fluorescent lamp of claim 2, wherein the diameter of said screw thread portion of said cylindrical part is smaller than the diameter of said straight portion of said cylindrical part.

4. The compact fluorescent lamp of claim 3, wherein said cylindrical part includes a second elongated recess on the outside thereof, and wherein said screw base includes a punched fixing protrusion extending into each said second recess whereby said screw base is fixed to said cylindrical part after being secured to said cylindrical part by screwing.

5. The compact fluorescent lamp of claims 1 or 4, wherein said maintaining plate includes guide projection having a notch, said notch being oriented in line with said first elongated recess.

6. The compact fluorescent lamp of claims 1 or 4, wherein said maintaining plate includes a perpendicular edge wall member at the edge thereof.

7. The compact fluorescent lamp of claim 5, wherein said maintaining plate includes a perpendicular edge wall member at the edge thereof.

8. The compact fluorescent lamp according to claim 4, comprising:
   said base member comprising at least one projection part positioned in said second recess of said cylindrical part of said chassis member, wherein said screw base is attached to said chassis member.

9. The compact fluorescent lamp according to claim 1, comprising:
   said cylindrical part including at least a second elongated recess on the outside thereof; and
   said base member comprising at least one projection part positioned in said second recess of said cylindrical part of said chassis member, whereby said screw base is attached to said chassis member.

* * * * *